(12) United States Patent
Ankney

(10) Patent No.: US 10,216,167 B1
(45) Date of Patent: Feb. 26, 2019

(54) POSITION DETECTION SYSTEM FOR A SLAT FLAP LEVER CONTROL

(71) Applicant: HAMILTON SUNDSTRAND CORPORATION, Charlotte, NC (US)

(72) Inventor: Darrell E. Ankney, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/718,212

(22) Filed: Sep. 28, 2017

(51) Int. Cl.
*G06K 7/10* (2006.01)
*G05B 19/12* (2006.01)

(52) U.S. Cl.
CPC ......... *G05B 19/12* (2013.01); *G06K 7/10297* (2013.01); *G05B 2219/23421* (2013.01)

(58) Field of Classification Search
CPC .......... G01D 5/12; G01C 23/00; G06Q 30/00; G05B 19/02; G05B 2219/23421; G06K 7/10297
USPC ....................................................... 235/375
See application file for complete search history.

(56) References Cited

U.S. PATENT DOCUMENTS

| | | | |
|---|---|---|---|
| 9,555,896 B2 | 1/2017 | Kneuper et al. | |
| 9,970,782 B1* | 5/2018 | Fink | G01D 5/12 |
| 2009/0289147 A1 | 11/2009 | Lavaud et al. | |
| 2014/0055586 A1* | 2/2014 | Pasini | A61B 1/06 348/68 |
| 2017/0032402 A1* | 2/2017 | Patsiokas | G06Q 30/0266 |
| 2017/0122779 A1 | 5/2017 | Krishna et al. | |
| 2017/0321485 A1* | 11/2017 | Bhosle | E21B 7/06 |
| 2018/0080795 A1* | 3/2018 | Roy | G01C 23/00 |

* cited by examiner

Primary Examiner — Daniel A Hess
(74) Attorney, Agent, or Firm — Cantor Colburn LLP

(57) ABSTRACT

A system for positional monitoring of a slat flap lever control assembly including multiple radio frequency identification device (RFID) tags operatively coupled to a movable portion of the control assembly, the movable portion operatively coupled to a lever. Also included is a RFID reader operatively coupled to a stationary portion of the control assembly and in operative communication with the RFID tags. Further included is a processor operatively connected to the RFID reader. The processor is configured to transmit a carrier signal via the RFID reader to the RFID tags. The processor is also configured to receive, via the RFID reader, reflected signals from the RFID tags, each of the reflected signals comprising a different carrier frequency. The processor is further configured to determine, based on the reflected signal from the RFID tags, an angular position of the movable portion of the lever assembly relative to the stationary portion.

12 Claims, 3 Drawing Sheets

POSITION DETECTION SYSTEM FOR A SLAT FLAP LEVER CONTROL

BACKGROUND

Exemplary embodiments pertain to the art of slat flap lever controls for aircrafts and, more particularly, to a position detection system and method associated with such slat flap lever controls.

Aircraft slat and flap systems include slats and flaps that are extended and retracted at variable positions depending on the aircraft's take-off or landing situation to provide high lift to the aircraft at lower aircraft speeds. Actuation of the slats and flaps is provided in response to input from an aircraft operator. The input is made by movement of a slat flap control lever. Current levers are analog and implemented using a rotary variable differential transformer (RVDT). After many cycles, the reliability of the analog lever may deteriorate due to changes in the RVDT air gap and channel-to-channel variation.

BRIEF DESCRIPTION

Disclosed herein is a system for positional monitoring of a slat flap lever control assembly including at least two radio frequency identification device (RFID) tags operatively coupled to a movable portion of the slat flap lever control assembly, the movable portion operatively coupled to a lever. Also included is a RFID reader operatively coupled to a stationary portion of the slat flap lever control assembly and in operative communication with the at least two RFID tags. Further included is a controller comprising a processor operatively connected to the RFID reader. The processor is configured to transmit a carrier signal via the RFID reader to the at least two RFID tags. The processor is also configured to receive, via the RFID reader, at least two reflected signals from the at least two RFID tags, each of the at least two reflected signals comprising a different carrier frequency. The processor is further configured to determine, via the processor, based on the reflected signal from the at least two RFID tags, an angular position of the movable portion of the lever assembly relative to the stationary portion.

In addition to one or more of the features described above, or as an alternative, further embodiments may include that the at least two RFID tags are in operative communication with a single channel of the RFID reader.

In addition to one or more of the features described above, or as an alternative, further embodiments may include at least one additional channel of the RFID reader, each additional channel respectively in operative communication with a plurality of additional RFID tags.

In addition to one or more of the features described above, or as an alternative, further embodiments may include that the numeral of total channels of the RFID reader corresponds to a total number of groups of RFID tags, the number of RFID tags in each of the total number of groups of RFID tags equaling a total number of discrete angular positions of the lever.

In addition to one or more of the features described above, or as an alternative, further embodiments may include that the total number of discrete angular positions is five.

In addition to one or more of the features described above, or as an alternative, further embodiments may include that the movable portion of the slat flap lever control assembly is a rotor operatively coupled to the lever.

In addition to one or more of the features described above, or as an alternative, further embodiments may include a communication system in operative communication with the RFID reader.

In addition to one or more of the features described above, or as an alternative, further embodiments may include that the communication system comprises a digital bus.

Also disclosed is a method of monitoring a lever position of a slat flap lever control. The method includes transmitting, via a RFID reader, a carrier signal to at least two RFID tags. The method also includes receiving, via the RFID reader, at least two reflected signals from the at least two RFID tags, wherein each of the at least two reflected signals comprise a different carrier frequency. The method further includes determining, via a processor, based on the reflected signal from the at least two RFID tags, an angular position of a lever.

In addition to one or more of the features described above, or as an alternative, further embodiments may include that the RFID reader comprises a plurality of channels, each of the channels in operative communication with respective groups of RFID tags to redundantly determine the angular position of the lever.

In addition to one or more of the features described above, or as an alternative, further embodiments may include that each of the groups of RFID tags include five RFID tags.

In addition to one or more of the features described above, or as an alternative, further embodiments may include communicating data received by the RFID reader to a digital bus.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. The embodiments disclosed herein assist in the control of a slat flap control lever by precisely measuring its position and movement with respect to a stationary portion of a slat flap control lever assembly.

Figure 1:
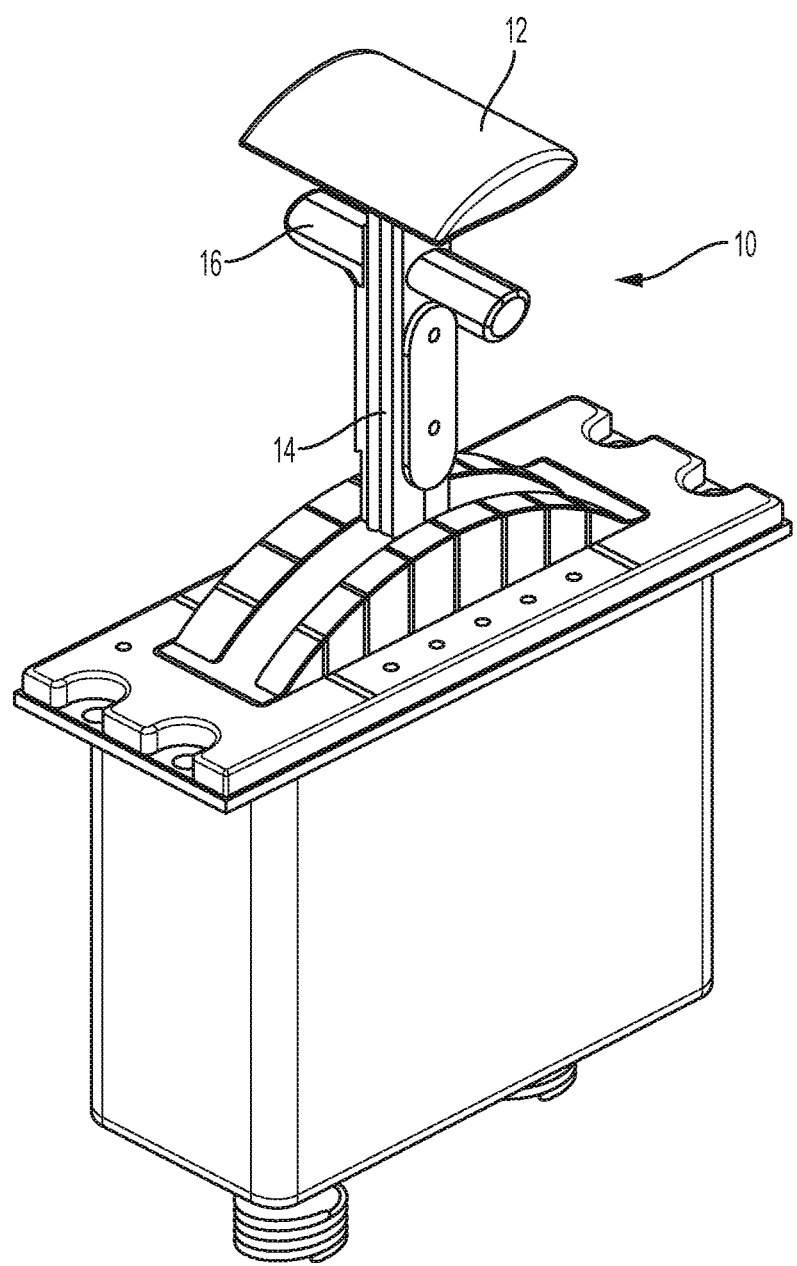
FIG. 1 is a perspective view of a slat flap control lever assembly.

FIG. 1 illustrates a slat flap control lever assembly and is generally referenced with numeral 10. The lever assembly 10 includes a hand grip 12 for grasping by an operator and lever 14 that controls actuation of slats and flaps associated with an aircraft wing. Also provided is a finger lift 16 that allows movement of the lever 14 when lifted by the operator.

Figure 2:
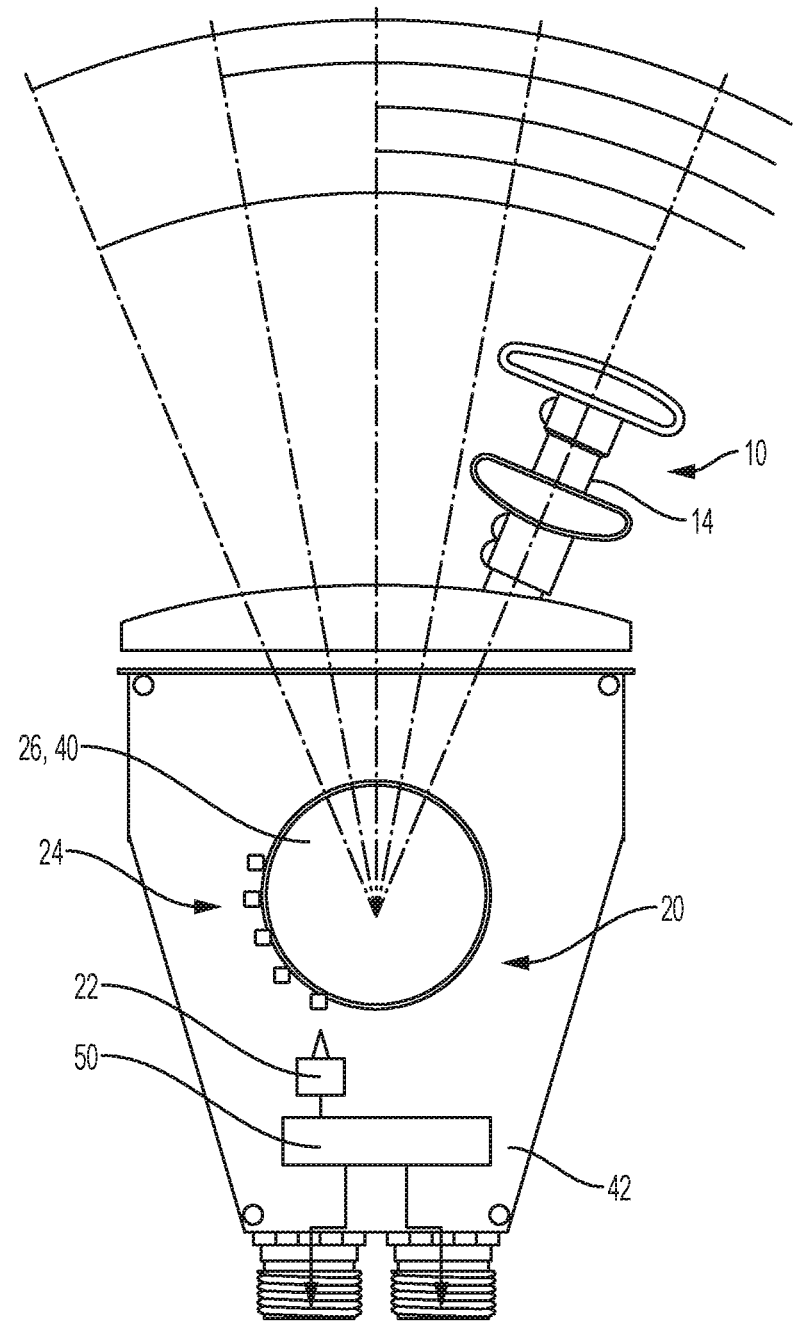
FIG. 2 is a side, elevational schematic view of the slat flap control lever assembly.

FIG. 2 illustrates the lever assembly 10 in more detail. In the illustrated embodiment, the lever 14 is movable over a range of five discrete angular positions. The lever 14 is rotatable over an angular range of positions, with discrete angular positions dictated by detents defined by a guide plate or the like. It is to be appreciated that five discrete angular positions is merely illustrative and that more or fewer discrete positions are contemplated. Verification that the lever 14 is in a desired angular position is provided with RFID technology via a RFID system 20, as described in detail herein.

Figure 3:
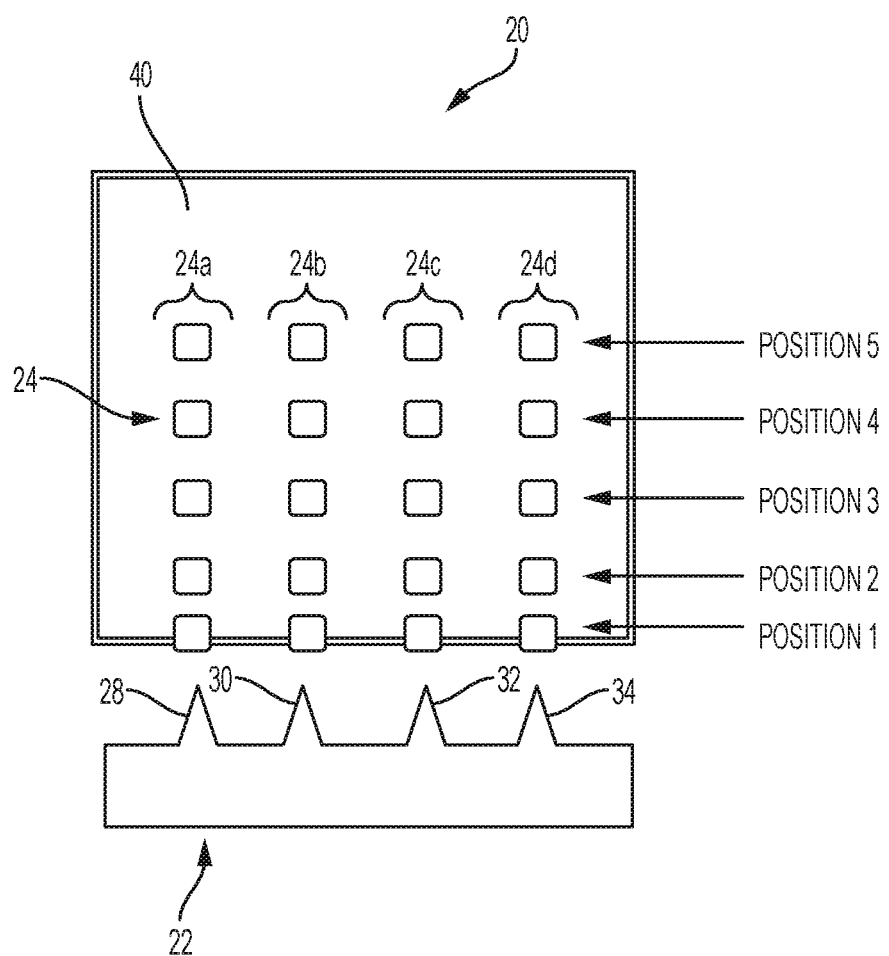
FIG. 3 is a schematic view of a radio-frequency identification (RFID) system of the slat flap control lever assembly.

Referring now to FIGS. 2 and 3, the RFID system 20 includes at least one RFID reader 22 configured on a stationary (unmovable) portion of the lever assembly 10. The RFID system 20 also includes a plurality of RFID tags 24 operatively coupled to one or more movable lever portions, such as the lever itself or a movable component 26 operatively coupled to the lever 14, such as a rotor. Movement of the movable component 26 corresponds to movement of the lever 14.

In some aspects, RFID reader 22 is a multi-channel reader, with each channel outputting a predetermined carrier signal from the stationary portion of the lever 14 to one or more of the RFID tags 24. Each RFID tag 24 is configured to receive and reflect a carrier signal to the RFID reader 22. The RFID reader 22 is configured for signal output at multiple frequencies, where each of the output frequencies are different from each other. This may be facilitated by having a plurality of channels of the RFID reader 22, such as channels 28, 30, 32, 34 of the illustrated embodiment of FIG. 3. It is contemplated that more or fewer channels are present in some embodiments. In the illustrated embodiment, channel 28 is configured to interact with the column of RFID tags referenced with numeral 24a; channel 30 is configured to interact with the column of RFID tags referenced with numeral 24b; channel 32 is configured to interact with the column of RFID tags referenced with numeral 24c; and channel 34 is configured to interact with the column of RFID tags referenced with numeral 24d.

The RFID reader 22 includes a signal generator, a signal transmitter, and a receiver, forming a RFID transceiver. The signal generator is configured to generate different carrier signals having different carrier frequencies. The signal transmitter includes one or more antenna configured to transmit the carrier signals generated by signal generator. Each of the signals generated have different carrier frequencies, such that when the signal is transmitted to an RFID tag 24, the reflected signal is received having the different frequency by one of the channels 28, 30, 32, 34.

FIGS. 2 and 3 depict a movable lever portion 40 and a stationary lever portion 42 according to one embodiment. In some embodiments, the movable lever portion 40 is a rotor that facilitates movement of the lever 14. The RFID reader 22 is attachable to the stationary lever portion 42 and configured to communicate with at least two RFID tags, each of the RFID tags corresponding to a different angular position of the lever 14. In the illustrated embodiment, five positions are shown and represented with five rows of RFID tags. In the example with four channels 28, 30, 32, 34, a total of 20 RFID tags 24 are present. Each of the channels 28, 30, 32, 34 are unique RFID receiver channels that receive a signal that indicates the position of the lever.

Since the signals transmitted from RFID reader 22 to the respective RFID tags are different from each other with respect to frequency, the system can accurately measure distance (e.g., within ±1 mm of accuracy) and motion (a change in distance with respect to time) between each of RFID tags 24 at the different positions and the RFID reader 22 based on the amount of change in phase between the reflected signals received by the receiving section and the carrier signals and the frequencies of the carrier signals (i.e., triangulation). The distances can accurately determine a position for the lever 14.

Accordingly, RFID reader 22 can receive at least two reflected signals from RFID tags 24 at different angular positions of the lever 14, where each of the at least two reflected signals have a different carrier frequency. Although five rows of RFID tags are shown on movable lever portion 40, it should be appreciated that there may be any number of RFID tags configured as an array on a single movable lever portion, and there may be multiple RFID readers configured to transmit a plurality of different carrier signals and receive their reflections from the multiple RFID tags on the panel.

The RFID reader 22 is operatively connected to one or more communication system 50. The communication system 50 is a signal translator and data bus in some embodiments. The communication system 50 translates the signals to angular positions of the lever 14 and communicates the position to a controller or other device that alerts an operator of the position and/or corrects the angular position to a desired position.

In some embodiments, the RFID reader 22 communicates with four RFID tags of the plurality of RFID tags 24 to provide redundancy, and a controller. The controller includes a processor connected to the RFID reader 22. The processor transmits four channel carrier signals via the RFID reader 22 to the four RFID tags at an angular position (i.e., common row of FIG. 3). Each of the transmitted carrier signals have a unique carrier frequency. The processor also receives four reflected signals from RFID tags. The processor determines position based on the reflected signal from the four RFID tags. Each of the four RFID channels detects the lever's angle of rotation and the position of the lever 14. The data transmitted corresponds to the pilot's commanded slat and flap position on the wing. The data associated with the pilot's command is then used in the movement of the slats/flaps.

The disclosed embodiments implement a four channel RFID between a positional rotary component and a four channel RFID transceiver. The rotational position from the RFID transceiver is translated to the communication system 50 (e.g., digital bus), such as CAN, ARINC 429, 1553, etc. The rotational positions are transmitted on the data bus as units of degrees and discrete in/out of detent position. The disclosed embodiments improve reliability due to the reduction in complexity of the system. This is attributed to contactless position sensors, precise sensing and a multi-channel redundant design. Additionally, the lever assembly weight is reduced by removing wire wound RVDT and reducing wiring harness weight by implementing a digital data bus.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The embodiments disclosed herein can be a system, a method, and/or a computer program product at any possible technical detail level of integration. The computer program product can include a computer readable storage medium (or media) having computer readable program instructions thereon for causing a processor to carry out aspects of the present disclosed embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the disclosed embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed embodiments.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for positional monitoring of a slat flap lever control assembly comprising:
    at least two radio frequency identification device (RFID) tags operatively coupled to a movable portion of the slat flap lever control assembly, the movable portion operatively coupled to a lever;
    a RFID reader operatively coupled to a stationary portion of the slat flap lever control assembly and in operative communication with the at least two RFID tags; and
    a controller comprising a processor operatively connected to the RFID reader, the processor configured to:
        transmit a carrier signal via the RFID reader to the at least two RFID tags;
        receive, via the RFID reader, at least two reflected signals from the at least two RFID tags, each of the at least two reflected signals comprising a different carrier frequency; and
        determine, via the processor, based on the reflected signal from the at least two RFID tags, an angular position of the movable portion of the lever assembly relative to the stationary portion.

2. The system of claim 1, wherein the at least two RFID tags are in operative communication with a single channel of the RFID reader.

3. The system of claim 2, further comprising at least one additional channel of the RFID reader, each additional channel respectively in operative communication with a plurality of additional RFID tags.

4. The system of claim 3, wherein the numeral of total channels of the RFID reader corresponds to a total number of groups of RFID tags, the number of RFID tags in each of the total number of groups of RFID tags equaling a total number of discrete angular positions of the lever.

5. The system of claim 4, wherein the total number of discrete angular positions is five.

6. The system of claim 1, wherein the movable portion of the slat flap lever control assembly is a rotor operatively coupled to the lever.

7. The system of claim 1, further comprising a communication system in operative communication with the RFID reader.

8. The system of claim 7, wherein the communication system comprises a digital bus.

9. A method of monitoring a lever position of a slat flap lever control comprising:
    transmitting, via a RFID reader, a carrier signal to at least two RFID tags;
    operatively coupling the at least two RFID tags to a moveable portion of a slat flap lever control assembly, the moveable portion operatively coupled to a lever;
    operatively coupling the RFID reader to a stationary portion of the slat flap lever assembly and in operative communication with the at least two RFID tags;
    receiving, via the RFID reader, at least two reflected signals from the at least two RFID tags, wherein each of the at least two reflected signals comprise a different carrier frequency; and
    determining, via a processor, based on the reflected signal from the at least two RFID tags, an angular position of the lever.

10. The method of claim 9, wherein the RFID reader comprises a plurality of channels, each of the channels in operative communication with respective groups of RFID tags to redundantly determine the angular position of the lever.

11. The method of claim 10, wherein each of the groups of RFID tags include five RFID tags.

12. The method of claim 9, further comprising communicating data received by the RFID reader to a digital bus.

* * * * *